US010627012B2

(12) United States Patent
Hande et al.

(10) Patent No.: US 10,627,012 B2
(45) Date of Patent: Apr. 21, 2020

(54) TERMINATION ARRANGEMENT FOR USE IN A HORIZONTAL CONNECTION SYSTEM

(71) Applicant: VETCO GRAY SCANDINAVIA AS, Sandvika (NO)

(72) Inventors: Olav Hande, Asker (NO); Rolf Bastesen, Vinterbro (NO); Anver Hussain Noor Ahmed, Kongsberg (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 0 days.

(21) Appl. No.: 16/304,598

(22) PCT Filed: May 23, 2017

(86) PCT No.: PCT/EP2017/062373
§ 371 (c)(1),
(2) Date: Nov. 26, 2018

(87) PCT Pub. No.: WO2017/207341
PCT Pub. Date: Dec. 7, 2017

(65) Prior Publication Data
US 2019/0293207 A1   Sep. 26, 2019

(30) Foreign Application Priority Data
Jun. 2, 2016  (NO) .................................. 20160953

(51) Int. Cl.
*F16L 1/26* (2006.01)
*E21B 43/013* (2006.01)
(Continued)

(52) U.S. Cl.
CPC .............. *F16L 1/26* (2013.01); *E21B 43/013* (2013.01); *F16L 1/12* (2013.01); *F16L 37/10* (2013.01); *F16L 53/32* (2018.01)

(58) Field of Classification Search
CPC . F16L 1/26; F16L 37/10; F16L 37/101; E21B 43/013
See application file for complete search history.

(56) References Cited

U.S. PATENT DOCUMENTS

| 2009/0090500 | A1 | 4/2009 | Damsleth et al. |
| 2012/0298216 | A1* | 11/2012 | Geertsen ................. F16L 53/32 137/340 |

(Continued)

FOREIGN PATENT DOCUMENTS

NO     20141417 A     5/2016

OTHER PUBLICATIONS

PCT Search Report and Written Opinion issued in connection with corresponding Application No. PCT/EP2017/062373 dated Aug. 10, 2017.

*Primary Examiner* — Sunil Singh
(74) *Attorney, Agent, or Firm* — Baker Hughes Patent Organization

(57) ABSTRACT

A termination arrangement for use in a horizontal connection system for subsea connection of a first tubular member to a second tubular member, the termination arrangement including a base structure with a horizontal tubular body. The first tubular member is rotatably mounted to the tubular body through an annular bearing. An internal fluid chamber accommodating a liquid having heat-storing capacity is formed inside the tubular body and delimited at one end by the annular bearing and at another end by a rear end wall. A section of the first tubular member extends through the fluid chamber and is in contact with the liquid in the fluid chamber so as to allow the liquid to delay cooling of this section of the first tubular member by means of heat stored in the liquid.

13 Claims, 2 Drawing Sheets

(51) Int. Cl.
*F16L 1/12* (2006.01)
*F16L 37/10* (2006.01)
*F16L 53/32* (2018.01)

(56) References Cited

U.S. PATENT DOCUMENTS

2014/0103636 A1 4/2014 Hestetun
2014/0290902 A1 10/2014 Haande

* cited by examiner

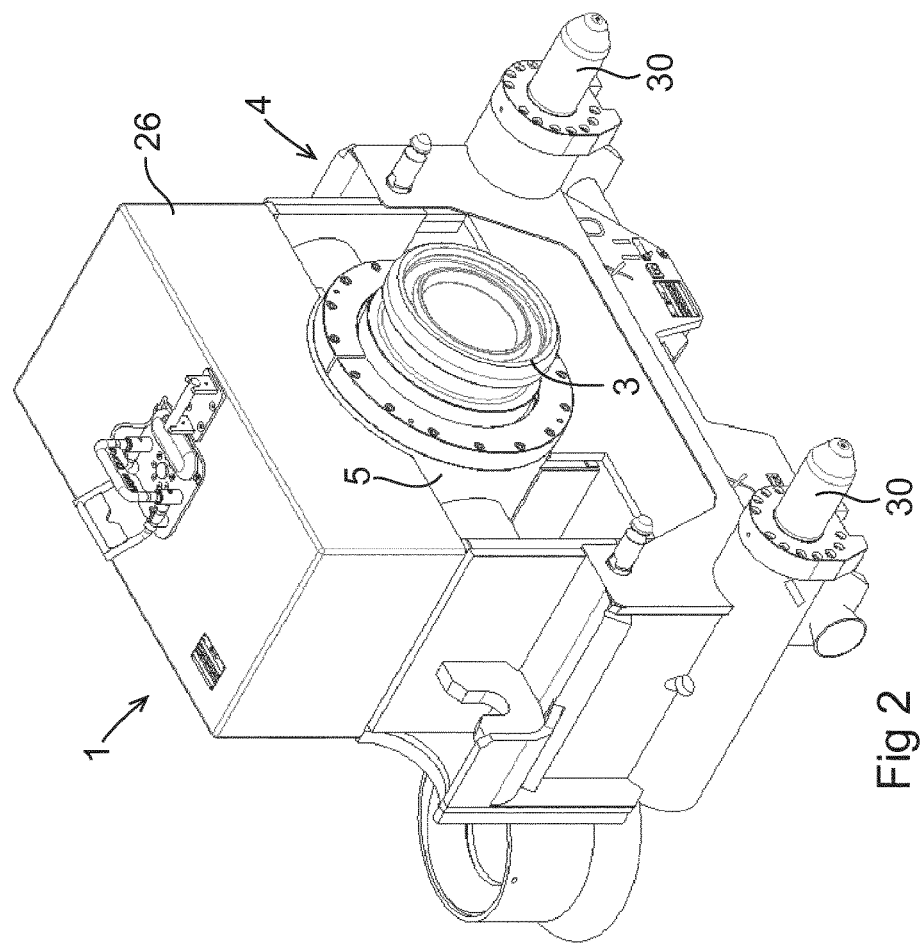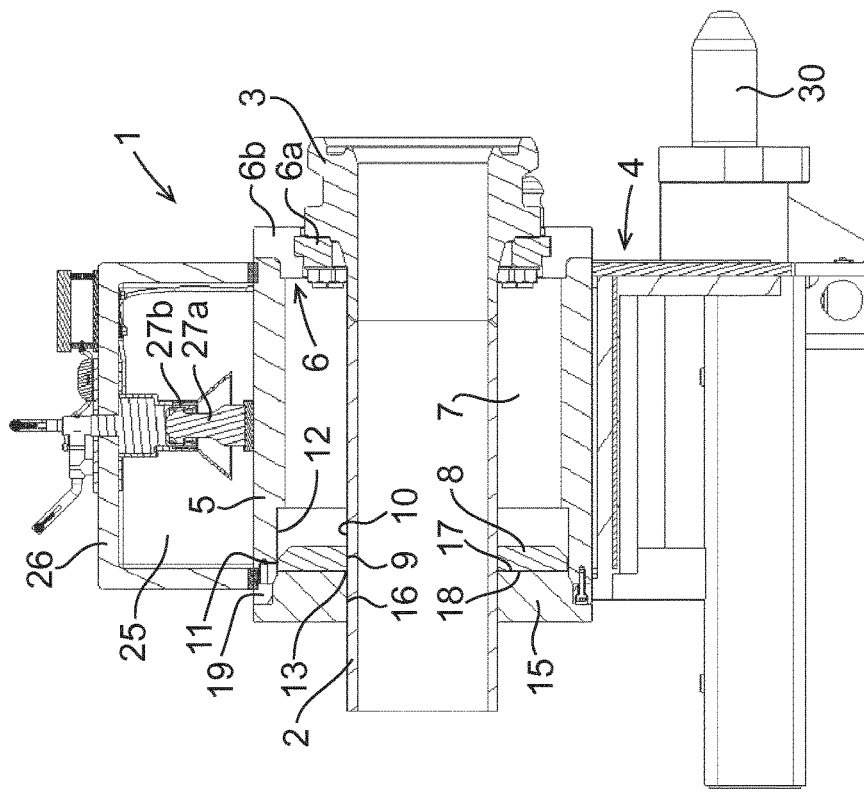

TERMINATION ARRANGEMENT FOR USE IN A HORIZONTAL CONNECTION SYSTEM

BACKGROUND OF THE INVENTION

Embodiments of the present invention relate to a termination arrangement 1 for use in a horizontal connection system for subsea connection of a first tubular member to a second tubular member, wherein a hub at an end of the first tubular member is configured for engagement with a corresponding hub at an end of the second tubular member.

At an offshore field for oil and gas exploitation, so-called flowlines may be used for connecting manifolds and christmas trees. At each end of the flowline there is a hub, which is attached to a flowline termination. The end section of the flowline that is welded to the hub is called pup-piece. In order to bring a flowline hub into contact with a mating hub, the flowline termination and the associated flowline hub may be moved axially towards the mating hub by means of a stroking tool, whereupon the flowline hub is secured to the mating hub, for instance by means of a clamp connector or collet connector. In particular for laying of long flowlines, a swivel attachment between the flowline hub and the associated flowline termination is preferred to avoid any problems with torsion or alignment with the fixed subsea connection. Hereby, the flowline hub is allowed to swivel in the flowline termination during installation and during the stroking effected by the stroking tool, and it is thereby possible to prevent torsion from being induced between the flowline hub and the flowline termination during the stroking.

In connection with oil and gas producing installations it is well known that rapid cooling of the production fluid during a temporary interruption of the production may result in the formation of hydrates, which may cause clogging of pipes and pipe connections. The cooling is caused by the ambient cold sea water. To delay cooling of the production fluid in case of an interruption of the production, some form of thermal insulation has to be provided on pipes, pipe couplings and other elements through which the production fluid is flowing.

SUMMARY OF THE INVENTION

The object of the present invention is to achieve a termination arrangement of the above-mentioned type with improved thermal protection for the tubular member which is rotatably mounted to the termination arrangement, to thereby provide a termination arrangement which is well-suited for use at sea depths where the surrounding sea water has a very low temperature.

According to embodiments of the invention, this object is achieved by a termination arrangement.

The termination arrangement of embodiments of the present invention is to be used in a horizontal connection system for subsea connection of a first tubular member to a second tubular member, wherein a hub at an end of the first tubular member is configured for engagement with a corresponding hub at an end of the second tubular member. A base structure of the termination arrangement comprises a tubular body which extends in a horizontal direction and which has a front end facing the hub of the first tubular member and an opposite rear end. The first tubular member is rotatably mounted to the tubular body through an annular bearing provided at the front end of the tubular body. The base structure comprises an internal fluid chamber which is formed inside the tubular body and delimited at a front end by said annular bearing and at an opposite rear end by a rear end wall, wherein this fluid chamber accommodates a liquid having heat-storing capacity. The first tubular member extends through a central opening in the rear end wall, wherein a section of the first tubular member extends through the fluid chamber from the rear end of the fluid chamber to the front end thereof and is in contact with the liquid in the fluid chamber so as to allow the liquid to delay cooling of this section of the first tubular member by means of heat stored in the liquid.

The liquid enclosed in the fluid chamber of the tubular body forms a thermal barrier between the first tubular member and the ambient sea water on the outside of the termination arrangement. The section of the first tubular member extending through the fluid chamber is protected from cooling too rapidly by means of heat stored in the liquid inside the fluid chamber. The liquid inside the fluid chamber is heated by heat emitted from the first tubular member during normal operation. This heat emanates from the production fluid flowing through the tubular member. If the heat input to the first tubular member from the production fluid is decreased or interrupted for some reason, the heat stored in the liquid inside the fluid chamber will slow down the cooling of said section of the first tubular member caused by the ambient cold sea water on the outside of the termination arrangement. Thus, the liquid-filled tubular body of the base structure will form a heat bank which provides efficient thermal protection for the first tubular member without obstructing the rotatability of the first tubular member in relation to the base structure of the termination arrangement.

According to an embodiment of the invention, a ring-shaped member of open cell polymer foam is located in the fluid chamber with a lateral surface of the ring-shaped member in contact with the rear end wall, wherein an inner edge of the ring-shaped member is in contact with the envelope surface of the first tubular member and an outer edge of the ring-shaped member is in contact with an inner surface of the tubular body. Due to the softness and deformability of the open cell polymer foam material, the ring-shaped member may be arranged between the rotatable first tubular member and the tubular body without obstructing the ability of the first tubular member to rotate in relation to the tubular body. The open cell polymer foam material allows the ring-shaped member to be soaked with liquid like a sponge when the fluid chamber is filled with liquid. When soaked with liquid, the ring-shaped member will counteract liquid flow through possible gaps between the rear end wall and the envelope surface of the first tubular member and/or between the rear end wall and the inner surface of the tubular body.

According to another embodiment of the invention, a ring-shaped or tubular insulating member of open cell polymer foam is mounted to a section of the first tubular member located outside the fluid chamber, wherein an inner edge of the insulating member is in contact with the envelope surface of the first tubular member and a lateral surface of the insulating member is in contact with the rear end wall. Due to the softness and deformability of the open cell polymer foam material, the insulating member may be arranged in contact with the first tubular member, the rear end wall and the tubular body without obstructing the ability of the first tubular member to rotate in relation to the tubular body. The open cell polymer foam material allows the insulating member to be soaked with sea water like a sponge when the termination arrangement is lowered into the sea for subsea installation. After the installation, the sea water contained in the porous and spongy insulating member will be heated by heat emitted from the first tubular member during normal operation. This heat emanates from the production fluid flowing through the first tubular member. If the heat input from the production fluid is decreased or interrupted for some reason, the heat stored in the sea water contained in the insulating member will slow down the cooling of the first tubular member caused by the ambient cold sea water on the outside of the first tubular member. Furthermore, owing to the fact that the interior of the insulating member is in fluid communication with the ambient sea, the internal pressure of the insulating member will correspond to the pressure of the ambient sea water at the depth where the termination arrangement is located. Thus, the insulating member will not be compressed and collapse under the effect of hydrostatic pressure at great sea depths. The insulating member will also counteract flow of sea water through possible gaps between the rear end wall and the envelope surface of the first tubular member and/or between the rear end wall and the inner surface of the tubular body.

Further features of the termination arrangement of embodiments of the present invention will appear from the following description and the dependent claims.

BRIEF DESCRIPTION OF THE DRAWINGS

With reference to the appended drawings, a specific description of preferred embodiments of the invention cited as examples follows below. In the drawings:

FIG. 1 is a longitudinal section through a termination arrangement according to a first embodiment, FIG. 2 is a perspective view of the termination arrangement of FIG. 1.

DETAILED DESCRIPTION

Figure 3:
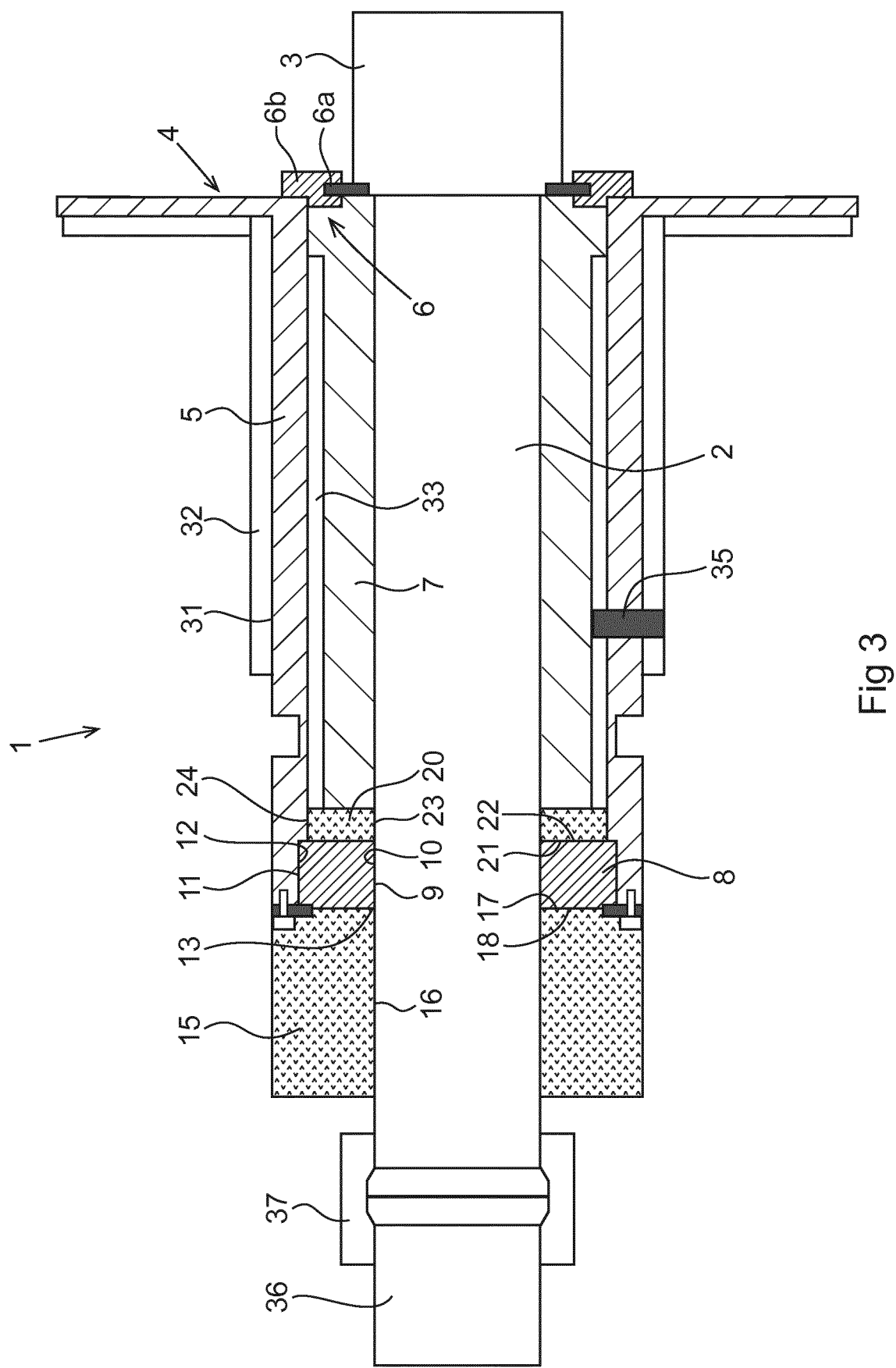
FIG. 3 is a schematic longitudinal section through a termination arrangement according to a second embodiment.

A first embodiment of a termination arrangement 1 according to embodiments of the present invention is illustrated in FIGS. 1 and 2 and another embodiment of a termination arrangement 1 according to embodiments of the present invention is illustrated in FIG. 3. The termination arrangement 1 is to be used in a horizontal connection system for subsea connection of an end of a first tubular member 2 to an end of a second tubular member (not shown), wherein a hub 3 at the end of the first tubular member 2 is configured for engagement with a corresponding hub (not shown) at the end of the second tubular member. The end of the first tubular member 2 is fixed to the termination arrangement 1 during and after the connection of the two tubular members to each other, whereas the end of the second tubular member is fixed to a subsea support structure during and after the connection of the two tubular members to each other. The hub 3 of the first tubular member 2 may be secured to the hub of the second tubular member by means of a clamp connector of conventional type or any other suitable type of connector. The first and second tubular members and the associated hubs are of metallic material, for instance stainless steel.

The termination arrangement 1 is for instance a flowline termination, in which case the above-mentioned subsea support structure may be a pipe termination of a subsea installation, such as e.g. a subsea production manifold.

The termination arrangement 1 comprises a base structure 4, wherein the base structure 4 comprises a tubular body 5 which extends in a horizontal direction and which has a front end facing the hub 3 of the first tubular member 2 and an opposite rear end. The first tubular member 2 is rotatably mounted to the tubular body 5 through an annular bearing 6 provided at the front end of the tubular body so as to allow the first tubular member 2 and the associated hub 3 to swivel in relation to the tubular body 5.

In the illustrated examples, the annular bearing 6 comprises a ring-shaped first bearing member 6a, which is fixed to the hub 3 of the first tubular member 2, and a ring-shaped second bearing member 6b, which is fixed to the tubular body 5. The first and second bearing members 6a, 6b are slidably connected to each other in order to allow the first bearing member 6a to rotate in relation to the second bearing member 6b and thereby allow the first tubular member 2 to rotate in relation to the tubular body 5.

The base structure 4 comprises an internal fluid chamber 7 which is formed inside the tubular body 5 and which accommodates a liquid having heat-storing capacity, in an embodiment, in the form of sea water. The fluid chamber 7 is delimited in radial direction by the tubular body 5, at a front end by the annular bearing 6 and at an opposite rear end by a rear end wall 8. Thus, the annular bearing 6 forms a front end wall of the fluid chamber 7. An inner edge 9 of the rear end wall 8 is in contact with the envelope surface 10 of the first tubular member 2 and an outer edge 11 of the rear end wall 8 is in contact with an inner surface 12 of the tubular body 5. In order to allow the first tubular member 2 to rotate in relation to the tubular body 5, the rear end wall 8 is in sliding contact with the first tubular member 2 and/or the tubular body 5. The first tubular member 2 extends through a central opening 13 in the rear end wall 8, wherein a section of the first tubular member 2 extends through the fluid chamber 7 from the rear end of the fluid chamber to the front end thereof and is in contact with the liquid in the fluid chamber 7 so as to allow the liquid in the fluid chamber to delay cooling of this section of the first tubular member by means of heat stored in the liquid.

The liquid contained in the fluid chamber 7 will be heated by heat emitted from the first tubular member 2 during normal operation. This heat emanates from the production fluid flowing through the first tubular member 2. If the heat input from the production fluid is decreased or interrupted for some reason, the heat stored in the liquid contained in the fluid chamber 7 will slow down the cooling of the first tubular member 2 caused by the ambient cold sea water on the outside of the termination arrangement 1.

A ring-shaped or tubular insulating member 15 of open cell polymer foam is mounted to a section of the first tubular member 2 located outside the fluid chamber 7, wherein an inner edge 16 of the insulating member 15 is in contact with the envelope surface 10 of the first tubular member 2 and a lateral surface 17 of the insulating member 15 is in contact with a lateral surface 18 of the rear end wall 8. The insulating member 15 may be fixed to the first tubular member 2 and in sliding contact with the tubular body 5. In the embodiment illustrated in FIG. 1, the insulating member 15 is in sliding contact with a ring 19 of low-friction material, such as for instance polyoxymethylene, which is mounted to the rear edge of the tubular body 5.

In the embodiment illustrated in FIG. 3, a ring-shaped member 20 of open cell polymer foam is located in the fluid chamber 7 with a lateral surface 21 of the ring-shaped member 20 in contact with a lateral surface 22 of the rear end wall 8, wherein an inner edge 23 of the ring-shaped member 20 is in contact with the envelope surface 10 of the first tubular member 2 and an outer edge 24 of the ring-shaped member 20 is in contact with the inner surface 12 of the tubular body 5. The ring-shaped member 20 may be fixed to the tubular body 5 and arranged in sliding contact with the first tubular member 2. As an alternative, the ring-shaped member 20 may be fixed to the first tubular member 2 and arranged in sliding contact with the tubular body 5. In the illustrated example, the ring-shaped member 20 has the form of a ring-shaped disc.

In the embodiment illustrated in FIGS. 1 and 2, the termination arrangement 1 also comprises a fluid chamber 25 arranged on the outside of the tubular body 5, wherein this fluid chamber 25 is configured to accommodate a liquid having heat-storing capacity, in an embodiment, in the form of sea water. This fluid chamber 25 is separated from the ambient sea water by a hood 26, which is releasably connectable to the tubular body 5. A first coupling member 27a is fixed to the tubular body 5 and arranged to project vertically upwards therefrom. The hood 26 is provided with a second coupling member 27b which is configured for connection to the first coupling member 27a in order to keep the hood 26 secured to the tubular body 5.

In the embodiment illustrated in FIGS. 1 and 2, the termination arrangement 1 is provided with two pin-shaped alignment members 30 configured for engagement with tubular alignment members on the above-mentioned subsea support structure. The alignment members 30 on the termination arrangement 1 are designed to come into contact with the corresponding alignment members on the subsea support structure when the termination arrangement 1 is horizontally moved towards the subsea support structure, or when the subsea support structure is horizontally moved towards the termination arrangement 1, so as to properly align the hub 3 of the first tubular member 2 with the hub of the second tubular member.

In the embodiment illustrated in FIG. 3, no fluid chamber is provided on the outside of the tubular body 5. In this case, a part of an outer surface 31 of the tubular body 5 is covered by a layer 32 of thermally insulating material in order to thermally insulate this part of the tubular body 5 from ambient sea water. Furthermore, a part of the inner surface 12 of the tubular body 5 is covered by a layer 33 of thermally insulating material in the embodiment illustrated in FIG. 3.

The thermally insulating material of the above-mentioned layers 32, 33 may be any type of insulating material suitable for forming an insulating layer on subsea pipes and other parts of subsea appliances exposed to sea water. Several such insulating materials are available on the market. The insulating material is with advantage a multi-layer coating system particularly developed for subsea use, such as for instance a multi-layer coating system marketed by the company Advanced Insulation Systems under the product name ContraTherm® or a multi-layer coating system marketed by the company Trelleborg under the product name Vikotherm®.

A non-return valve 35 (see FIG. 3) may be arranged in the tubular body 5, wherein this non-return valve 35 is configured to prevent liquid from flowing out into the surroundings from the fluid chamber 7 inside the tubular body 5 and to allow liquid to flow from the surroundings into the fluid chamber 7 when the external liquid pressure acting on the tubular body 5 exceeds the pressure in the fluid chamber 7 to a given extent. Thus, the non-return valve 35 will automatically open under the effect of the external hydrostatic pressure and thereby allow sea water to flow into the fluid chamber 7 inside the tubular member 5 when the termination arrangement 1 is lowered into the sea for subsea installation. Hereby, the fluid chamber 7 is automatically filled with sea water.

In the illustrated examples, the first tubular member 2 is a pup piece which for instance may be fixed to an end of a flowline 36 (see FIG. 3) by means of a suitable connector 37.

Embodiments of the invention are of course not in any way restricted to the embodiments described above. On the contrary, many possibilities to modifications thereof will be apparent to a person with ordinary skill in the art without departing from the basic idea of embodiments of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A termination arrangement for use in a horizontal connection system for subsea connection of a first tubular member to a second tubular member, wherein a hub at an end of the first tubular member is configured to engage a corresponding hub at an end of the second tubular member, the termination arrangement comprising:
    a base structure comprising:
        a tubular body which extends in a horizontal direction and has a front end facing the hub of the first tubular member and an opposite rear end, the first tubular member is rotatably mounted to the tubular body through an annular bearing provided at the front end of the tubular body; and
        a fluid chamber inside the tubular body and delimited at a front end by the annular bearing and at an opposite rear end by a rear end wall, the fluid chamber accommodating a liquid with a heat-storing capacity,
        wherein the first tubular member extends through a central opening in the rear end wall, and a section of the first tubular member extends through the fluid chamber from the rear end of said chamber to the front end thereof and is in contact with the liquid in the fluid chamber so as to allow the liquid to delay cooling of said section by transferring heat from the liquid to said section; and
    a ring-shaped or tubular insulating member comprised of open cell polymer foam mounted to a section of the first tubular member located outside the fluid chamber, wherein an inner edge of the insulating member is in contact with an envelope surface of the first tubular member and a lateral surface of the insulating member is in contact with the rear end wall,
    wherein the insulating member is fixed to the first tubular member and is in sliding contact with the tubular body.

2. A termination arrangement for use in a horizontal connection system for subsea connection of a first tubular member to a second tubular member, wherein a hub at an end of the first tubular member is configured to engage a corresponding hub at an end of the second tubular member, the termination arrangement comprising:
    a base structure comprising:
        a tubular body having a front end facing the hub of the first tubular member and an opposite rear end, the first tubular member is rotatably mounted to the tubular body through an annular bearing provided at the front end of the tubular body; and a fluid chamber inside the tubular body and delimited at a front end by the annular bearing and at an opposite rear end by a rear end wall, the fluid chamber accommodating a liquid with a heat-storing capacity, wherein the first tubular member extends through a central opening in the rear end wall, and a section of the first tubular member extends through the fluid chamber from the rear end of said chamber to the front end thereof and is in contact with the liquid in the fluid chamber so as to allow the liquid to delay cooling of said section by transferring heat from the liquid to said section; and a ring-shaped or tubular insulating member mounted to a section of the first tubular member located outside the fluid chamber, wherein an inner edge of the insulating member is in contact with an envelope surface of the first tubular member, a lateral surface of the insulating member is in contact with the rear end wall, and the insulating member is in sliding contact with the tubular body.

3. The termination arrangement according to claim 2, wherein the ring-shaped member has the form of a ring-shaped disc.

4. The termination arrangement according to claim 2, wherein at least a part of an outer surface of the tubular body is covered by a layer of thermally insulating material in order to thermally insulate this part of the tubular body from ambient sea water.

5. The termination arrangement according to claim 2, wherein at least a part of an inner surface of the tubular body is covered by a layer of thermally insulating material.

6. The termination arrangement according to claim 2, wherein an outer edge of the rear end wall is in sliding contact with an inner surface of the tubular body.

7. The termination arrangement according to claim 2, wherein an inner edge of the rear end wall is in sliding contact with the envelope surface of the first tubular member.

8. The termination arrangement according to claim 2, wherein a non-return valve is arranged in the tubular body, wherein this non-return valve is configured to prevent liquid from flowing out into the surroundings from the fluid chamber and to allow liquid to flow from the surroundings into the fluid chamber when the external liquid pressure acting on the tubular body exceeds the pressure in the fluid chamber.

9. The termination arrangement according to claim 2, wherein the first tubular member is a pup piece.

10. The termination arrangement according to claim 2, wherein the termination arrangement is a flowline termination.

11. The termination arrangement according to claim 2, wherein the insulating member is comprised of open cell polymer foam.

12. A termination arrangement for use in a horizontal connection system for subsea connection of a first tubular member to a second tubular member, wherein a hub at an end of the first tubular member is configured to engage a corresponding hub at an end of the second tubular member, the termination arrangement comprising:

a base structure comprising:

a tubular body having a front end facing the hub of the first tubular member and an opposite rear end, the first tubular member is rotatably mounted to the tubular body through an annular bearing provided at the front end of the tubular body; and a fluid chamber inside the tubular body and delimited at a front end by the annular bearing and at an opposite rear end by a rear end wall, the fluid chamber accommodating a liquid with a heat-storing capacity, wherein the first tubular member extends through a central opening in the rear end wall, and a section of the first tubular member extends through the fluid chamber from the rear end of said chamber to the front end thereof and is in contact with the liquid in the fluid chamber so as to allow the liquid to delay cooling of said section by transferring heat from the liquid to said section; and a ring-shaped or tubular insulating member mounted to a section of the first tubular member located outside the fluid chamber, wherein an inner edge of the insulating member is in contact with an envelope surface of the first tubular member, a lateral surface of the insulating member is in contact with the rear end wall, and the insulating member is in sliding contact with a ring of low friction material mounted to the rear edge of the tubular body.

13. The termination arrangement according to claim 12, wherein the insulating member is comprised of open cell polymer foam.

* * * * *